US012784103B2

(12) United States Patent
Kreider et al.

(10) Patent No.: US 12,784,103 B2
(45) Date of Patent: Nov. 3, 2026

(54) DATA PACKET PROCESSING METHODS, SYSTEMS, AND APPARATUS

(71) Applicant: Nasdaq, Inc., New York, NY (US)

(72) Inventors: Brian Kreider, Westminster, CO (US); Stephen Cooper, Louisville, CO (US)

(73) Assignee: Nasdaq, Inc., New York, NY (US)

( * ) Notice: Subject to any disclaimer, the term of this patent is extended or adjusted under 35 U.S.C. 154(b) by 29 days.

(21) Appl. No.: 19/085,110

(22) Filed: Mar. 20, 2025

(65) Prior Publication Data

US 2025/0217888 A1 Jul. 3, 2025

Related U.S. Application Data

(63) Continuation of application No. 18/239,230, filed on Aug. 29, 2023, now Pat. No. 12,260,458, which is a continuation of application No. 16/940,449, filed on Jul. 28, 2020, now Pat. No. 11,783,416, which is a continuation of application No. 16/427,480, filed on May 31, 2019, now Pat. No. 10,755,354, which is a continuation of application No. 14/841,938, filed on Sep. 1, 2015, now Pat. No. 10,319,033.

(60) Provisional application No. 62/044,718, filed on Sep. 2, 2014.

(51) Int. Cl.
*G06Q 40/04* (2012.01)
*H04L 9/40* (2022.01)

(52) U.S. Cl.
CPC ........... *G06Q 40/04* (2013.01); *H04L 63/083* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 5,216,670 | A | 6/1993 | Ofek | |
| 6,157,651 | A | 12/2000 | Meares | |
| 6,278,982 | B1 * | 8/2001 | Korhammer | G06Q 40/06 705/36 R |
| 6,910,134 | B1 | 6/2005 | Maher, III | |
| 7,181,765 | B2 * | 2/2007 | Patel | H04L 63/1408 713/153 |

(Continued)

FOREIGN PATENT DOCUMENTS

| | | | | |
|---|---|---|---|---|
| CN | 105989179 A | * 10/2016 | G06Q 40/04 |
| CN | 113095941 A | * 7/2021 | G06N 3/08 |

(Continued)

OTHER PUBLICATIONS

Sharaf, H., et al., “Extended Berkeley Packet Filter: An Application Perspective” IEEE Access (Oct. 15, 2022) (Year: 2022).*

(Continued)

*Primary Examiner* — Daniel S Felten
(74) *Attorney, Agent, or Firm* — NIXON & VANDERHYE P.C.

(57) ABSTRACT

A network capture device receives data packets received by one or more packet switches in a data communications network and processes each of the data packets decoding the data packet and determining whether the data packet is a financial data packet or not. The network capture device transmits, to a risk exposure computer system, the data packets determined to be financial data packets.

18 Claims, 5 Drawing Sheets

(56) References Cited

U.S. PATENT DOCUMENTS

| | | | | |
|---|---|---|---|---|
| 7,418,732 | B2 * | 8/2008 | Campbell | H04L 63/145 726/23 |
| 7,444,301 | B2 * | 10/2008 | Conklin | G06Q 20/10 705/37 |
| 7,778,915 | B2 | 8/2010 | Angle et al. | |
| 7,870,047 | B2 * | 1/2011 | Mojsilovic | G06Q 40/00 705/36 R |
| 7,958,251 | B2 * | 6/2011 | Smith | G06Q 40/06 709/250 |
| 7,962,582 | B2 | 6/2011 | Potti | |
| 8,010,442 | B2 | 8/2011 | Angle et al. | |
| 8,082,205 | B2 * | 12/2011 | Lutnick | G06Q 40/00 705/37 |
| 8,224,732 | B1 | 7/2012 | Mahoney | |
| 8,386,371 | B2 | 2/2013 | Kittelsen et al. | |
| 8,386,633 | B2 | 2/2013 | Smith | |
| 8,433,641 | B2 | 4/2013 | Angle et al. | |
| 8,468,244 | B2 * | 6/2013 | Redlich | G06Q 50/18 715/255 |
| 8,489,496 | B2 | 7/2013 | Angle et al. | |
| 8,555,077 | B2 | 10/2013 | Davis | |
| 8,566,115 | B2 | 10/2013 | Moore | |
| 8,689,350 | B2 | 4/2014 | Davis | |
| 8,732,822 | B2 | 5/2014 | Schechter | |
| 8,788,396 | B2 | 7/2014 | Cole et al. | |
| 8,838,495 | B2 | 9/2014 | Kittelsen | |
| 8,881,283 | B2 | 11/2014 | Tuvell | |
| 9,064,010 | B2 * | 6/2015 | Maharajh | G06F 16/437 |
| 9,245,115 | B1 | 1/2016 | Jakobsson | |
| 9,906,630 | B2 | 2/2018 | Hughes | |
| 9,965,441 | B2 | 5/2018 | Sajeepa | |
| 9,990,393 | B2 | 6/2018 | Parsons | |
| 10,078,694 | B2 | 9/2018 | Maharajh | |
| 10,121,196 | B2 | 11/2018 | Parsons | |
| 10,181,158 | B2 | 1/2019 | Oberlechner | |
| 10,284,440 | B2 | 5/2019 | Singhal | |
| 10,296,974 | B2 | 5/2019 | Kittelsen | |
| 10,319,033 | B2 | 6/2019 | Kreider et al. | |
| 10,402,902 | B1 * | 9/2019 | Isaacson | G06Q 40/04 |
| 10,659,354 | B2 | 5/2020 | Jalan | |
| 10,755,354 | B2 | 8/2020 | Kreider et al. | |
| 10,764,194 | B2 | 9/2020 | Kagan | |
| 10,862,989 | B2 | 12/2020 | Lowry | |
| 11,783,416 | B2 | 10/2023 | Kreider et al. | |
| 2002/0004776 | A1 * | 1/2002 | Gladstone | G06Q 40/04 705/37 |
| 2002/0091621 | A1 | 7/2002 | Conklin | |
| 2002/0161693 | A1 * | 10/2002 | Greenwald | G06Q 30/0601 705/26.1 |
| 2003/0093347 | A1 | 5/2003 | Gray | |
| 2003/0149653 | A1 * | 8/2003 | Penney | G06Q 40/00 705/37 |
| 2003/0229810 | A1 | 12/2003 | Bango | |
| 2004/0225748 | A1 | 11/2004 | Chong | |
| 2006/0288208 | A1 * | 12/2006 | Dashora | G06F 8/656 713/167 |
| 2007/0053513 | A1 | 3/2007 | Hoffberg | |
| 2007/0089172 | A1 | 4/2007 | Bare | |
| 2007/0240217 | A1 * | 10/2007 | Tuvell | H04L 63/145 713/188 |
| 2008/0086776 | A1 * | 4/2008 | Tuvell | G06F 21/552 726/24 |
| 2009/0254572 | A1 * | 10/2009 | Redlich | G06Q 10/10 |
| 2010/0211520 | A1 | 8/2010 | Oddie | |
| 2011/0166982 | A1 | 7/2011 | Cole et al. | |
| 2011/0302087 | A1 | 12/2011 | Crooks | |
| 2013/0097065 | A1 * | 4/2013 | Lutnick | G06Q 40/04 705/37 |
| 2013/0262287 | A1 | 10/2013 | Parsons et al. | |
| 2014/0081823 | A1 * | 3/2014 | Phadnis | G06Q 40/04 705/37 |
| 2021/0160351 | A1 * | 5/2021 | Michon | H04L 69/324 |
| 2022/0414778 | A1 * | 12/2022 | Parsons | G06Q 40/04 |
| 2024/0054559 | A1 * | 2/2024 | Joshua | H04L 47/564 |
| 2024/0127336 | A1 * | 4/2024 | Goyal | G06Q 40/04 |

FOREIGN PATENT DOCUMENTS

| | | | | |
|---|---|---|---|---|
| EP | 1722509 | | 11/2006 | |
| WO | WO-0058890 | A1 * | 10/2000 | G06Q 40/04 |
| WO | WO-0150317 | A2 * | 7/2001 | G06Q 40/04 |
| WO | WO-2009015334 | A2 * | 1/2009 | G06Q 40/03 |
| WO | WO-2013006439 | A1 * | 1/2013 | G06Q 40/00 |
| WO | 2015/069688 | | 5/2015 | |

OTHER PUBLICATIONS

U.S. Appl. No. 18/239,230, filed Aug. 29, 2023, Kreider et al.

International Search Report and Written Opinion of the International Searching Authority mailed Jan. 11, 2016 in PCT/US2015/047924, 11 pages.

International Preliminari Report on Patentability issued Mar. 10, 2017 in PCT/US15/47924, 26 pages.

Metcalfe, R., and Boggs, D., "Ethernet: Distributing Switching for Local Computer Networks," CSL 75 7 May 1975, reprinted Feb. 1980, 22 pages.

McCanne, S. and Jacobson, V., "The BSD Packet Filter: A New Architecture for User-level Packet Capture" Lawrence Berkeley Laboratory, Dec. 19, 1992, 11 pages.

G.P. Chandranmenon et al, "Trading packet headers for packet processing" IEEE/ACM Transactions on Networking, vol. 4, No. 2, Apr. 1996, 1 page.

Definition Data Packet, Computer Science Wiki retrieved https://computersciencewiki.org/index.php/Data_packet, from Feb. 22, 2022, 4 pages.

* cited by examiner

DATA PACKET PROCESSING METHODS, SYSTEMS, AND APPARATUS

RELATED APPLICATION

This application is a continuation of U.S. patent application Ser. No. 18/239,230, filed Aug. 29, 2023, which is a continuation of U.S. patent application Ser. No. 16/940,449, filed Jul. 28, 2020 (now U.S. Pat. No. 11,783,416), which is a continuation of U.S. patent application Ser. No. 16/427,480, filed May 31, 2019 (now U.S. Pat. No. 10,755,354), which is a continuation of U.S. patent application Ser. No. 14/841,938, filed Sep. 1, 2015 (now U.S. Pat. No. 10,319,033), which claims the benefit of U.S. provisional patent application 62/044,718, filed Sep. 2, 2014, the entire contents of each of which are incorporated herein by reference.

TECHNOLOGY OVERVIEW

The technology relates to systems and methods for monitoring network traffic to detect, collect, and analyze data packets for patterns, irregularities, and/or indicators that are desirable to identify. One non-limiting example application of the technology relates to collecting and analyzing intraday security issue data messages involving potential disparate systems, multiple parties, and multiple liquidity destinations.

BACKGROUND

Various computer systems can assist in the formulation and submission of user-initiated (e.g., securities trading) computer transactions to processing destinations (e.g., a liquidity destination), collect and process information related to consummated transactions after a predetermined time, (e.g., the close of the securities market each day), and enable risk and portfolio risk modeling and analysis after that time, (e.g., a post market analysis system). In addition, computer systems exist that support intraday risk analysis and modeling but only for those transactions processed through, or integrated with, such systems.

The popularity of disparate computerized trading systems, Delivery versus Payment (DVP) or Receipt versus Payment (RVP) transactions and multiple prime brokerage relationships creates situations where intraday risk exposure from large volume, large dollar U.S. equity transactions performed by a computerized trading exchange needs to be properly managed by Pre-Trade Computer Systems, Intraday Closed Computer Systems, Post Market Computer Systems or Post Market Analysis Computer Systems so that significant losses that can result from delayed response to intraday risk exposure are avoided.

Institutional clients often use brokers to initiate computer transactions involving United States equities that are physically held and cleared by another broker or custodial bank, via Delivery versus Payment (DVP) or Receipt versus Payment (RVP) transactions. Risk management computer systems used by executing brokers must also manage risks associated with these transactions, even if they are not integrated with the risk management computer systems of other potentially involved executing brokers and/or with one or more risk management computer systems of one or more relevant custodians. Risks associated with these types of transactions which might be evident after close of the trading day need to be identified automatically and earlier.

Hedge funds and other institutional investors increasingly participate in "away" trades. This means that the trade was initiated by an executing broker other than the client's clearing firm or prime broker on an agency basis (e.g. securities were bought and sold directly into or out of the clients account) or on a riskless principle basis (the trade initiating broker sends the trade in for execution at a computerized trading exchange after receiving an order from the investor and then allocates the trade to the investor's account with a markup/markdown or commission). In both situations, the trade is performed electronically and by one or more computers using an identifier (generally known in the industry as a "Neumonic" or "MPID") that is different than the investor's identifier but is subsequently allocated to that investor through the Depository Trust Company (DTC) for clearing at the investor's clearing firm. In addition, hedge funds and other institutional investors enter into multiple clearing arrangements with clearing firms or prime brokers. In this latter situation, the investor may have funds on deposit at each firm and each firm, actually clears his/her transactions, or he/she may have a DVP/RVP relationship with one or more of the firms where the trades are transferred (generally referred to in the industry as "given up") to the firm that will actually do the clearing of the transaction. In all of the above situations, risks associated with transactions may only be evident after close of the trading day.

U.S. Pat. No. 7,778,915 describes computer technology that addresses such intraday risks by automatically collecting real time data from a plurality of liquidity destinations in trading at least one of securities, commodities, options, futures, and derivatives. The real time data include information on computer-implemented transactions of financial articles of trade after they have been submitted to the liquidity destinations. The computer system aggregates real time data provided by the plurality of liquidity destinations and then preferably converts and streams it in a standardized form. Criteria are defined (e.g., by a user) to identify relevant portions of the real time data (e.g., identify risk situations) and stored in memory (e.g., a computer data base). The computer system compares standardized real time data against the defined criteria to determine what if any defined criteria are impacted by the real time data and to generate any of a variety of suitable outputs for review and/or action by the user and/or the computer system.

Notwithstanding with this sophisticated real time data collection and analysis method and system, the inventors identified areas for improvement. A technical assumption in existing computerized trading systems is that all computerized trading systems are properly configured to be monitored by a risk analysis system such as that described in U.S. Pat. No. 7,778,915. That assumption does not account, for example, for a "rogue" computer securities trading algorithm. Because a rogue computer securities trading algorithm is not configured to be monitored by the risk analysis system, it may be able to avoid detection and flood the market with unauthorized or undesirable computer-generated trade order data messages in a very short time frame.

In 2012, Knight Capital experienced what many in the industry call a "rogue algorithm." The exact details of the cause of the technology issue are unclear, but what is known is that a computer-implemented trading algorithm which should not have been running was automatically buying and selling shares of equities of several companies that sent volumes and prices soaring. When the computer-implemented trading algorithm was identified and shut off after 45 minutes of trading, Knight Capital had lost over 440 million USD. Thus, a technical problem to be resolved is how to protect against rogue computer-implemented trading algorithms. Another technical problem is how to detect a rogue computer-implemented trading algorithm when data relating to that rogue algorithm is not provided to or detected by a conventional risk analysis system.

SUMMARY

The technology developed by the inventors addresses and resolves these and other technical problems.

When a user, e.g., an institutional client, sends a trade data message including one or more packets to a data communications network, those packets pass through one or more switches, e.g., one or more switches in a network owned or operated by a broker that allows the institutional client to trade under its market participant identifier (MPID). The one or more switches is/are configured to mirror all of the packet traffic that passes through those one or more switches to a network capture device. While the packets proceed to the appropriate exchange or destination, the network capture device or another node or entity in communication with the network capture device, e.g., a packet analyzer or filter, analyzes the packets to detect packets that correspond to financial network traffic, e.g., orders for financial instruments. Financial network traffic packets are passed on for further processing by a risk analysis system to detect predetermined patterns, irregularities, and/or other indicators of possible financial risk. By capturing all financial network traffic regardless of the trading algorithm being configured for risk monitoring, "rogue" computer securities trading algorithms and other order generators not configured to be monitored can still be monitored for risk and potentially be automatically shut down in the event of excessive risk.

Example embodiments include a method and apparatus for detecting undesirable data packets. Data packets are received from multiple sources at one or more packet switches in a data communications network, and the one or more packet switches route the data packets to one or more intended destination computing nodes. The one or more switches transmit a copy of all the data packets received in the data communications network to a network capture device that is separate from the one or more intended destination computing nodes. The network capture device processes the packets in the data packets and detecting financial data packets and transmits the detected financial data packets for analysis by a risk exposure computer system that performs automatic financial risk analysis based on the detected financial data packets.

In one example implementation, the network capture device transmits the detected financial data packets to a normalization data processor that eliminates duplicate data packets and converts remaining detected financial data packets to a standard data packet format. The normalization data processor transmits the converted financial data packets for analysis by the risk exposure computer system.

The data packets from multiple sources may include intraday security issue information involving potential disparate systems, multiple parties, and multiple liquidity destinations. The detected financial data packets may include order information or order execution for financial instruments and/or may include data packets associated with computer securities trading algorithms and other order generators that are not expected, authorized, or configured for risk monitoring.

In an example implementation, the network capture device is a packet analyzer, a network analyzer, a protocol analyzer, or a packet sniffer that decodes each data packet's header or other fields in the data packet to determine if it relates to financial network data packets.

The transmitting of a copy of all the data packets to the network capture device is preferably done in parallel with the routing of the data packets to one or more intended destination computing nodes and does not impact desired data packet communications and processing.

In an example implementation, the risk analysis system analyzes the financial data packets for predetermined patterns, trends, outages irregularities, and/or other indicators of possible financial risk. The financial network data packets may include pre-trade, at-trade, and post-trade data packets, and the risk analysis system may analyze the financial data packets for pre-trade risks, at-trade risks, and post-trade risks. The risk analysis system may analyze the financial data packets using custom risk checks. The risk analysis system may detect a risk, and in response, initiate an action to mitigate the detected risk.

Another example embodiment includes a method and apparatus for processing data packets. A copy of data packets that are sent from multiple sources are received for routing to one or more intended destination computing nodes. The received copy of data packets are decoded to identify financial data packets. The identified financial data packets are then transmitted for automatic financial risk analysis based on the detected financial data packets.

Another example embodiment includes a method and apparatus for routing data packets. Data packets are received from multiple sources at one or more packet switches in a data communications network. The one or more packet switches route the data packets to one or more intended destination computing nodes and also transmit a copy of all the data packets received in the data communications network to a network capture device that is separate from the one or more intended destination computing nodes for detecting financial data packets for automatic financial risk analysis.

The features described herein may be combined to form additional embodiments and sub-elements of certain embodiments may form yet further embodiments. This summary is provided to introduce technology aspects that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

To further clarify the above and other advantages and features, a more particular description will be rendered by reference to non-limiting example embodiments, some of which are illustrated in the appended drawings. It is appreciated that these drawings depict only example embodiments and are therefore not to be considered limiting.

DESCRIPTION OF NON-LIMITING EXAMPLE EMBODIMENTS

Figure 1:
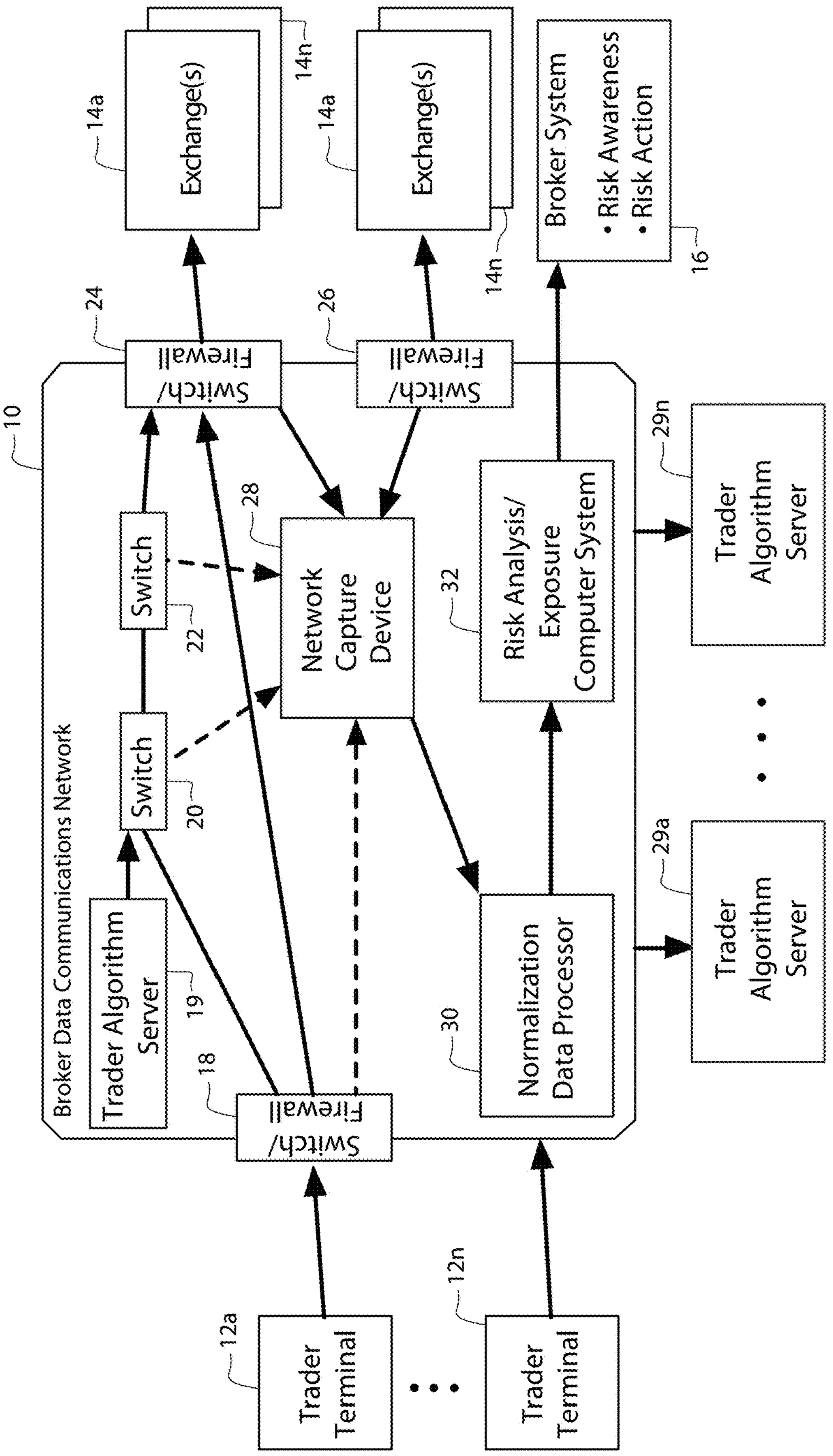
FIG. 1 is a schematic representation of a system in accordance with non-limiting example embodiments.

FIG. 1 is a schematic representation of a system in accordance with a non-limiting example embodiment. Multiple trader computer terminals 12*a* . . . 12*n* communicate (1) trade related data messages with a Broker data communications network 10 (which is typically an internal data communications network for the Broker's organization). Although shown outside, the trader terminals may reside inside or outside the Broker data communications network. FIG. 1 also shows multiple trader algorithm computer servers 29*a* . . . 29*n* that each perform computer-implemented automatic trading within the Broker data communications network. The Broker data communications network 10 includes one or more switches 18-26 for switching or directing packets from a source node to a destination node. In various embodiments, the switches may switch packets based on protocol layer 2 information, e.g., MAC header information, protocol layer 3 information, e.g., IP header information, or a combination of layer 2 and layer 3 information. A packet switch is sometimes understood to packet switch at layer 2 while packet router is sometimes understood to packet switch at layer 3. The technology includes but is not limited to embodiments that use switches, routers, and combination switch/routers.

The Broker data communications network 10 also communicates with one or more exchanges 14*a* . . . 14*n*, (e.g., trading exchanges, liquidity destinations, dark pools, etc.) and Broker systems 16 (only one is shown for simplicity). Such exchanges 14*a* . . . 14*n* and Broker systems 16 are controlled by one or more computer servers or the like. Although output packets is shown flowing from the trader terminals 12*a* . . . 12*n* via the Broker data communications network 10 to the exchanges 14*a* . . . 14*n* and Broker system 16, packet monitoring and risk assessment may also be performed on packets flowing in other directions including from the exchanges 14*a* . . . 14*n* and/or Broker system 16 to the trader terminals 12*a* . . . 12*n*. Communication may be via any suitable signal communication medium as described above including but not limited to wired, wireless, electrical, optical, or electromagnetic communications technology.

The switches 18, 24, and 26 on the borders of the Broker data communications network 10 preferably also include a firewall for data security and protection. Data packets received from trader terminals 12*a* . . . 12*n* is routed towards the exchanges 14*a* . . . 14*n* via one or more packet switches 18-26 in the network 10. These packet switches may be owned or operated, in one non-limiting example, by a broker that allows an institutional client to trade under its market participant identifier (MPID). One or more of these switches 18-26 is configured to mirror (copy) the packet flow it receives and sends the original packets on to their appropriate destination(s), which if those packets relate to trading means they are sent to one or more of the exchanges 14*a* . . . 14*n*. Each switch 18-26 may also be configured to send the mirrored packets to a network capture device 28. The network capture device 28 receives mirrored data packets from one or more of the switches 18-26.

In this example embodiment, the network capture device 28 receives all of the data packets that are transported through the Broker data communications network so that all data packets can be inspected. In example embodiments, the network capture device 28 identifies all data packets that relate to financial transactions and sends them to a normalization data processor 30 which eliminates duplicate packets and converts them to a standard format, if needed, before sending them to a risk analysis/exposure computer system 32. In other example embodiments, the network capture device 28 forwards all packets to another node or to a further entity, e.g., a packet filter, that identifies all of those packets that relate to financial transactions and sends them to a normalization data processor 30 which eliminates duplicate packets and converts them to a standard format, if needed, before sending them to a risk analysis/exposure computer system 32.

The network capture device 28 may be a packet analyzer, also known as a network analyzer, protocol analyzer, or packet sniffer, and is implemented using a programmed computer and/or using computing hardware which intercepts (and can if desired log) data packets passing over the data communications network 10. One example network capture device 28 is Velocimetrics "Tip-off" product.

As data streams flow across the data communications network 10, the network capture device 28 captures each data packet and, in non-limiting example embodiments, decodes the packet's header or other fields in the data packet to determine if it relates to financial network data packets. For example, decoded packets that contain both an=sign and a control A (ASIC 0) in a repeating pattern are likely to be FIX packets. FIX is a known financial data packet communications protocol. As another example, the packet analysis may be performed by decoding and identifying a data packet that is or relates to an OUCH (or other financial data communications protocol) login or other request. Packets that follow for that requested transmission are assumed to include OUCH packets.

One way to monitor all data packets in the Broker data communications network is via each network switch having a monitoring port that mirrors all packets passing through all ports of the switch. Another example approach is to use a network tap. Yet another example embodiment uses a packet analyzer such as tcpdump.

The risk analysis/exposure computer system 32 performs risk analysis (detailed examples are described below) and provides the results to a Broker computer system 16. Based on the results, the Broker computer system 16 may take some appropriate or desired risk awareness action.

This financial data packet routing and monitoring technology addresses and resolves a computer-implemented financial transactions system technical challenge and provides a number of advantages not provided by existing computer-implemented financial transaction systems. First, monitoring all the data packets in the network prevents a rogue algorithm and other unconfigured and/or unauthorized order generators from avoiding detection and analysis by a risk analysis/exposure system. No assumption is made that all computerized trading systems are properly configured to be monitored by a risk analysis/exposure system. As a result, risk protection is enhanced dramatically. Second, the monitoring technology which provides this risk protection enhancement is low cost. Third, no additional latency is introduced over and above that introduced by the network switch. Fourth, the data packet mirroring and analysis is done in parallel to and does not impact normal trade communications and processing. Fifth, by monitoring all financial trade data packets sent over the network, trading algorithms and other order generators which are unexpected and/or unauthorized in the network can be detected and trigger risk awareness actions. In situations where there are multiple, diverse order generation systems, configuration of each system to allow for risk monitoring and shut-down can be prohibitively expensive as each system would need to be individually modified. Sixth, the technology described in this application allows for a single point of set-up and configuration to enable automatic risk monitoring for all trading systems.

In the example case of the rogue algorithm at Knight Capital, which was not configured to run through any risk analysis engine, the technology in this application would nevertheless detect those rogue trades and take risk awareness actions. Even if those risk awareness actions are ignored, the risk analysis computer system may take additional steps and shut down the network port that the rogue algorithm is trading on to break communication between the algorithm and exchange(s) which would have triggered an automatic cancellation of all open orders by the exchange(s). Such actions would have severely limited the losses sustained by Knight Capital had they been taken.

Figure 2:
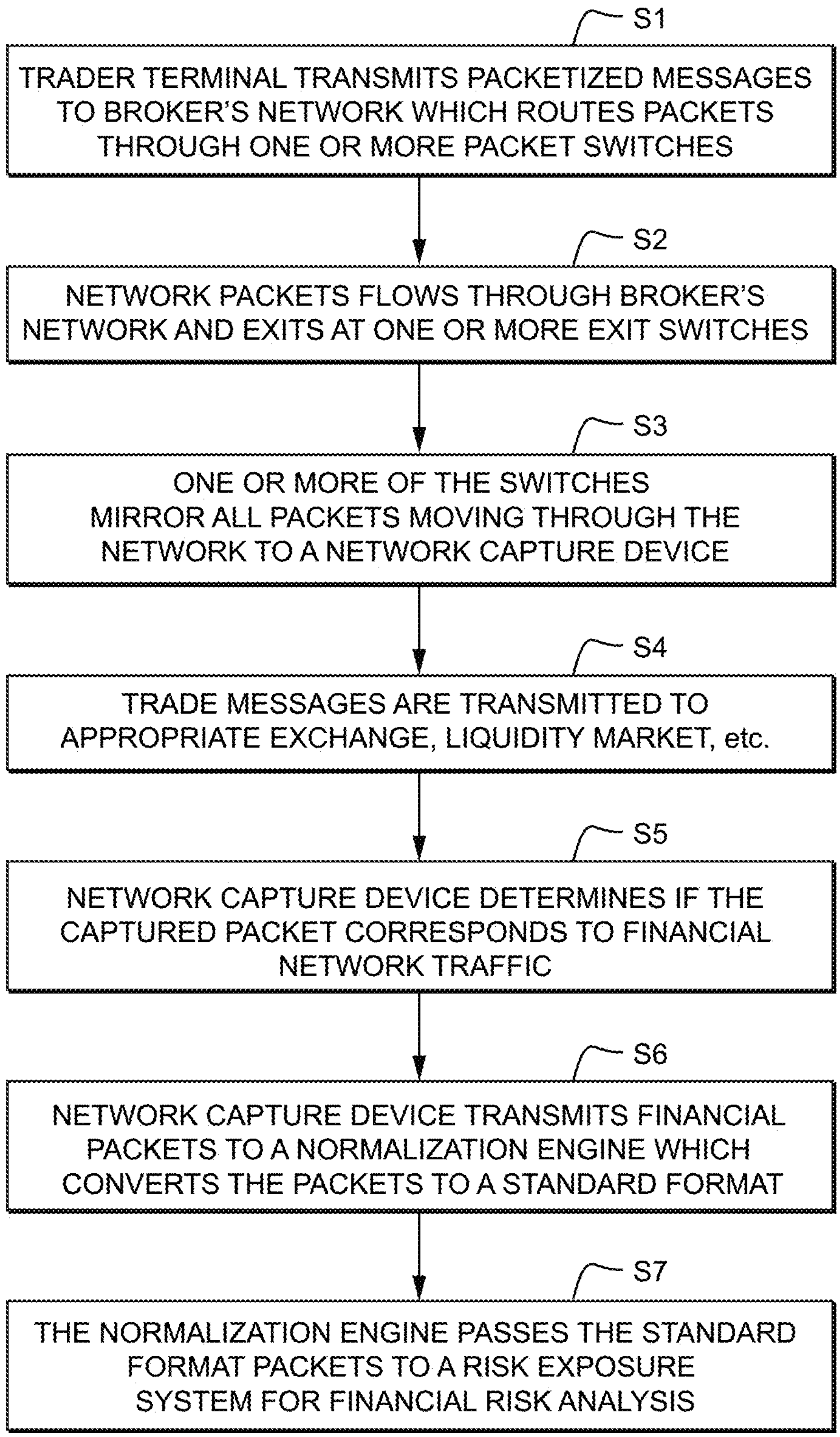
FIG. 2 is a flowchart illustrating example steps in accordance with non-limiting example embodiments.

FIG. 2 is a flowchart illustrating example steps in accordance with a non-limiting example embodiment. In step S1, trader terminals transmit packetized messages to a broker's network, and the network routes those packets via one or more packet switches through the network to one or more exit switches (step S2). One or more of the switches mirror (copy) all data packets moving through the network to a network capture device ((step S3). Meanwhile, the trade data packets continue on their way through the network (without any delay caused by the mirroring) to the appropriate exchange destination (step S4). The network capture device automatically processes the received data packets, e.g., by decoding each packet to extract packet information like packet header information, packet size, particular packet fields or indicators, etc., in order to detect those packets that relate to financial transactions (step S5). As mentioned above, the network capture device may, in example embodiments, pass the packets to another computer node or entity to perform this processing. The network capture device (or other packet processing node or entity) transmits those data packets that the decoding detects relate to financial transactions for risk analysis (step S6), and may optionally save the detected packets in a memory if desired. In example embodiments, those detected packets that relate to financial transactions are normalized into a standard format since the packets may originate from disparate sources that use different data formats. This normalization may be done by a normalization engine, which then sends the packets that relate to financial transactions, now in standard format, to the risk exposure system for financial risk analysis and action if warranted (step S7).

Figure 3:
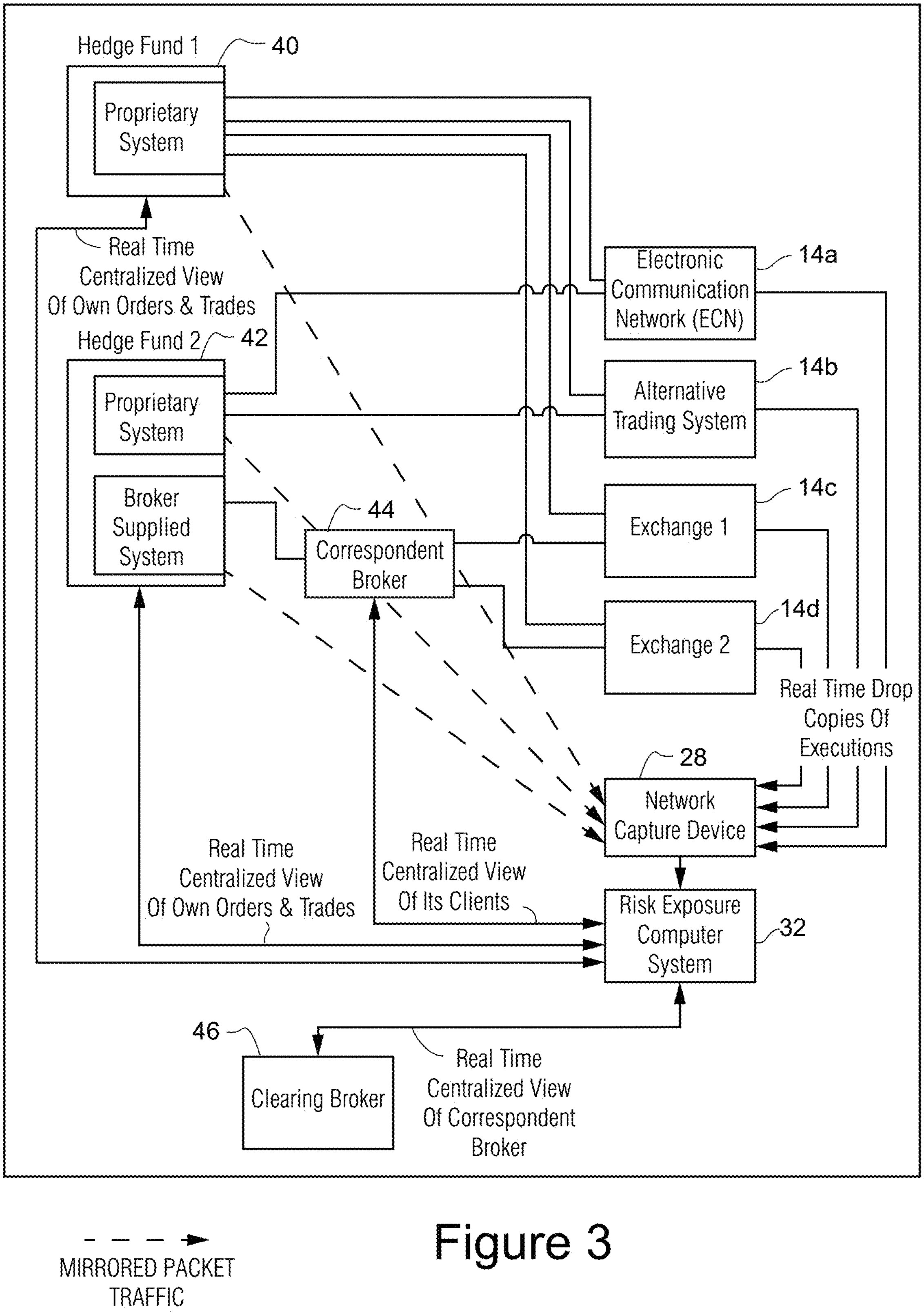
FIG. 3 is a function block diagram of another non-limiting example embodiment in the context of an illustrative financial trading and risk analysis system.

FIG. 3 is a function block diagram of another non-limiting example embodiment with an illustrative financial trading and risk analysis computer system that processes financial articles of trade. One example trading system, described in U.S. Pat. No. 7,778,915 and incorporated herein by reference, performs consolidation and analysis of intraday financial risk related to submitted securities, commodities, options, futures transactions, where securities, commodities, options, and futures are examples of financial articles of trade. The submitted securities, commodities, options, futures, or other financial articles of trade transaction involve at least one of disparate systems, multiple parties, and multiple liquidity destinations. Reference to securities or security transactions below include transactions involving securities, commodities, options, or futures. The term "other financial articles of trade" transaction refers to any other article traded at the liquidity destinations other than securities, commodities, options, and futures. It should be appreciated that different configurations can be used to consolidate and analyze the data to achieve a given result. Although particular combinations are disclosed, variations on those combinations can be used to achieve the same consolidation and analysis in the financial trading and risk analysis computer system.

Hedge Funds 1 and 2 (40 and 42) each buy and/or sell various securities asset classes such as equities and equity derivatives (e.g., futures and options) in Electronic Communication Networks (ECNs) 14*a*, Alternative Trading Systems (ATSs) 14*b*, and exchanges 14*c*, 14*d*. A correspondent broker 44 is an authorized member of and helps the Hedge Funds 40 and 42 access the Electronic Communication Networks (ECNs) 14*a*, Alternative Trading Systems (ATSs) 14*b*, and exchanges 14*c*, 14*d*. The Hedge Funds 40 and 42 may use the broker 44 or a standalone electronic trading system to affect trades, e.g., the Hedge Fund 42 uses a proprietary system to trade on the Electronic Communication Network (ECN) 14*a* as well as the Alternative Trading System (ATS) 14*b* and is using broker's system to trade on the Exchanges 14*c*, 14*d*. The Hedge Funds 40 and 42 and the broker 44 need to know about all the trading activities on a real time basis in order to more effectively manage their risk. Once a trade is executed, the trade must be settled using the clearing broker 46. Advantageously, all of the data packets traffic associated with the hedge funds 40 and 42, the broker, the Electronic Communication Networks (ECNs) 14*a*, Alternative Trading Systems (ATSs) 14*b*, and exchanges 14*c*, 14*d* are copied to the network capture device 28 for processing as described above.

The financial trading and risk analysis computer system 32 in FIG. 3 receives the financial data packets from the network capture device 28 and performs risk analysis based on those received final data packets. The risk analysis enables parties involved in the purchase and/or sale of securities, commodities and other financial articles to monitor intraday financial risk related to submitted securities transactions regardless of which securities trading system(s) were used by such party or such party's clients to affect such transactions, regardless of which liquidity destination or destinations was/were used to effect such transactions (e.g., the NYSE, NASDAQ or Alternative Trading Systems such as ECNs), and regardless of which third parties ultimately became involved in effecting such transactions (e.g., the initiating client, intermediary broker dealer(s), clearing firms, etc.).

At the same time that post-trade data is collected from the liquidity destinations, other financial information is collected from other sources including for example pre-trade financial transactions such as trader terminal orders identified by the network capture device from one or more networks that carry financial data packets. As financial data is collected from liquidity destinations and networks that carry financial data packets, other criteria, such as parameters of relevant account information may collected and stored so as to enable computer-implemented, real-time comparison of trading activity versus historical activity.

The risk exposure computer system 32 can interact with different network technologies and topologies to aggregate desired information. In some cases, the risk exposure computer system must be able to be configured to identify a particular private data messaging infrastructure to monitor and record appropriate transaction activity. In other cases, the risk exposure computer system may interact with other systems to make requests on a timed or event driven basis. This interaction could involve data message-based inquiries, direct access to databases, or other transaction-based requests. When relevant information related to a given financial situation is detected on one or more monitored networks, the relevant financial information is collected and, if necessary or desired, packaged, or translated into an appropriate normalized format and submitted for risk analysis. For example, the widely known FIX data protocol standard may be used as the standard format. Other data protocol formats could be used, e.g., OUCH or a proprietary format used only by the packet normalizer and risk analysis computer.

The risk exposure computer system 32 processes the received trade related data packets from the network capture device 28 and compares it against criteria, such as parameters or rules with regard to certain risks, trends, outages, uses, or other desired limits. The risk exposure computer system 32 can also leverage the capabilities of external analysis systems which may be commercially available to address particular risk, trend, outage, use scenarios, or other determining events. For example, an external analysis system could include a third party risk system for a particular class of securities or group of clients or other class. These parameters or rules and external analysis systems can be managed via a hierarchy to set overall criteria for a group of users, specialized criteria for individual users at any level within a defined hierarchy, or other criteria. These parameters or rules and external analysis systems can be used to adjust one or more composite ratings that will be used in other processing, or may simply accumulate a value or values for the impacted users and the hierarchy within which they exist.

Once the risk exposure computer system 32 determines that information warrants a responsive action, for example, the information equals, exceeds or falls below specified parameters or rules, notification alerts and/or action responses may be generated and sent. A configurable dashboard user interface may be used to display real-time views of aggregated trading activity across markets, asset classes, and trading systems. Notification alerts can be sent via e-mail, facsimile transmission, text message, voice, third-party message format/protocol or other messaging means to notify one or more user designated recipients, i.e., a human and/or machine, of a particular event. Notification alerts can require confirmation from recipients, if confirmation is not received within a defined timeframe. Also, follow-up notification alerts can be sent in accordance with user defined alert hierarchies until an acknowledgement is received from a designated recipient or recipients. Notification Alerts can be assigned priority to determine if they should be sent out instantaneously or after a specified amount of time, such as once an hour, a business driven window, such as once a day, or accumulate a certain number of messages before being released, or according to some other user criteria.

The risk exposure computer system 32 can also create action responses in an attempt to mitigate or maximize, as appropriate, the impact of identified situations in different scenarios. In this regard, an effective network(s) in which to affect an action response may be a network or networks other than the one in which the initial event occurred. For example, an action response may be to send a signal to the switch where the financial transactions are passing through, ordering that switch to stop all data packets on the port transporting the transactions. This would break the connection to the exchange and prevent further trades from occurring.

Figure 4:
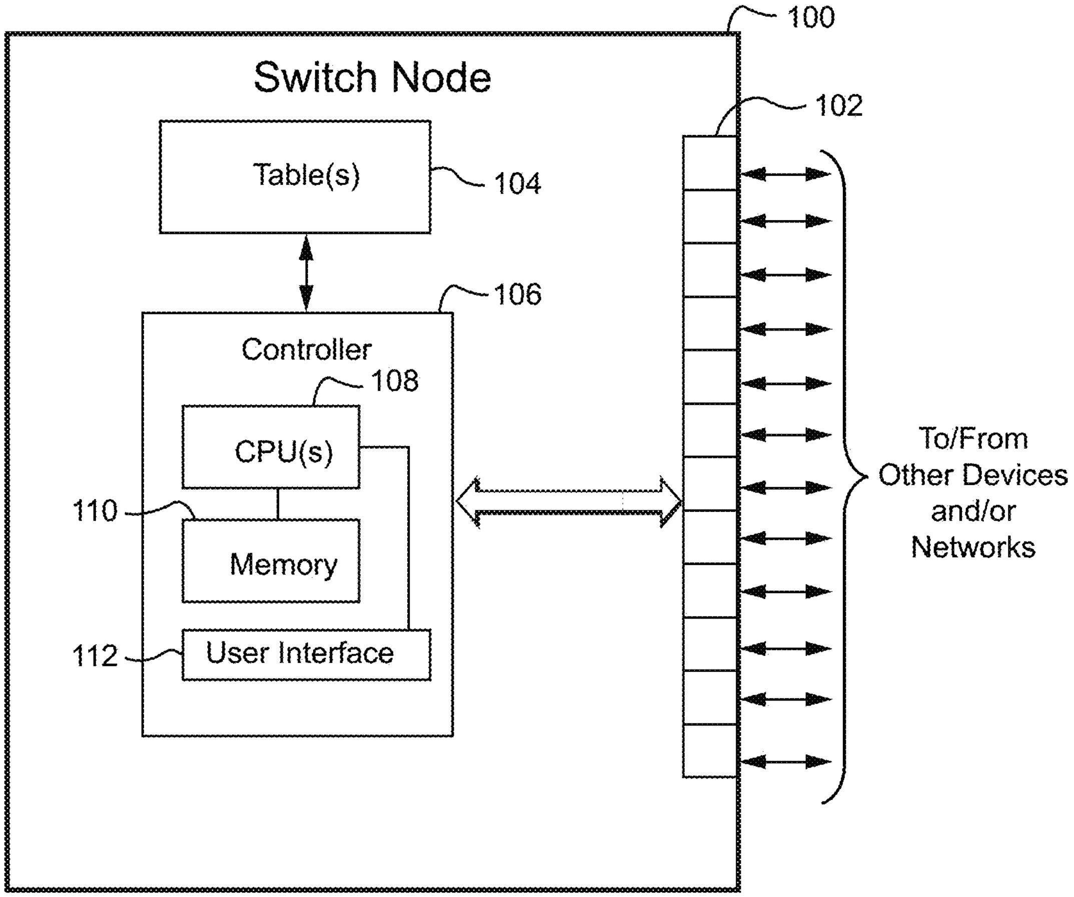
FIG. 4 is a function block diagram of an example of a non-limiting example embodiment of a switch node.

FIG. 4 is a function block diagram of an example of a non-limiting example embodiment of a network switch node 100. The network switch 100 is coupled to other network switching devices and/or network nodes using one or more ports 102. Switch 100 also includes a controller 106 that includes one or more processors or CPUs 108, one or more memories 110 (including but not limited to magnetic, flash-based, solid state, or other storage technology), and an optional user interface 112. The controller 106 is coupled to one or more forwarding information tables 104 that may include forwarding and/or routing information used by the switch 100 to forward network data packets via the one or more ports 112. In some examples, the one or more forwarding information tables 104 may include a media access control (MAC) table, a layer 3 (L3) table, and/or other tables and data structures. In particular, the controller using the routing tables to forward a mirror or copy of all of its data packets via one or more ports 102 to the network capture device 28 or 200 as described below.

Figure 5:
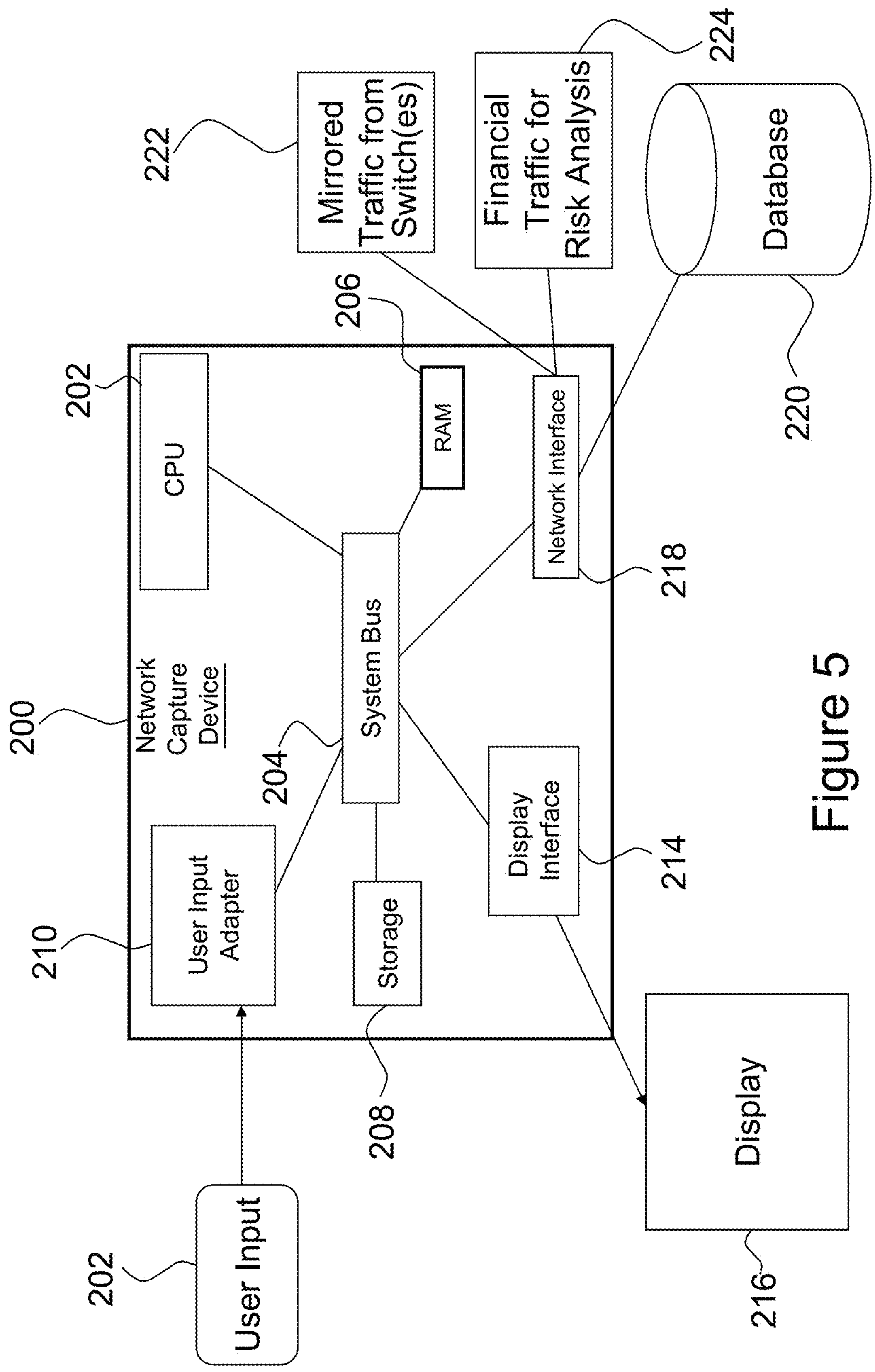
FIG. 5 is a function block diagram of an example of a non-limiting example embodiment of a network of a network capture device.

FIG. 5 is a function block diagram of an example of a non-limiting example embodiment of a network of a network capture device 200 that is programmed according to certain example embodiments. The network capture device 200 includes a central processing unit or CPU 202, a system bus 204 that communicates with RAM 206 and storage 208. The storage 208 can be magnetic, flash-based, solid state, or other storage technology. The system bus 204 communicates with user input adapter 210 (e.g., PS/2, USB interface, or the like) that allows users in input commands to network capture device 200 via a user input device 212 (e.g., a keyboard, mouse, touch panel, or the like). The results of the processing may be displayed to a user on a display 216 via display interface 214 (e.g., a video card or the like).

The network capture device 200 may also include a network interface 218 (e.g., a transceiver) to facilitate wired (e.g., Ethernet-802.3x) and/or wireless communication (WiFi/802.11x protocols, cellular technology, and the like) with external systems 222 such as one or more of the packet switches like the network switch node 100 shown in FIG. 4 and/or one or more databases 220. External systems 222 may also include other processing systems, such as systems that provide third party services, client devices, server systems, or other computing nodes similar to that of computing node 200, e.g., to form a distributed computing system. External systems 222 may also include network attached storage (NAS) to hold large amounts of data. External systems, along with the internal storage and memory, may form a storage system for storing and maintaining information (e.g., graphical models, event log data, etc.). Such a system may communicate with users and/or other computing systems to implement the techniques described herein. The database 220 may include relational, object orientated, or other types of databases for storing information (e.g., the makeup of an index, a tracked about of cash that has been generated by index components, etc.).

In certain examples, a CPU may include multiple cores (e.g., (core1, core2, core3, and core4) that are all coupled to on-die memory (e.g., L2 or L3 cache memory). It will be appreciated that other architecture types may be used. For example, a multiple processor system may be used and the distinct processors may share fast onboard cache memory. Systems with additional, fewer, or single cores are also contemplated.

The risk exposure computer system 32 may automatically monitor and manage risk in several categories. Non-limiting examples in computerized trading exchanges include buying power/threshold restrictions, restricted and hard to borrow securities risk management, short sell restriction risk management, single order quantity limit management, single order value risk management, realized and unrealized profit and loss. The risk management system can be loaded with clients' overnight buying power and stock positions. During the day, the risk exposure computer system receives copies of all client messages of a financial nature in real-time, performs risk calculations, generates appropriate alerts, and/or takes appropriate action.

The risk exposure computer system 32 can check for the following example risk parameters and raise an alert if any of the defined parameters or rules is violated. Other customized risks checks may be added.

The following detailed examples are non-limiting and refer to a risk exposure computer system labeled RX which stands for RiskXposure to check for, detect, and manage all types of financial trading risks called "risk checks" across exchanges, clients, regions, and asset classes (e.g., equities, options, futures, etc.) to better manage exposure, and prevent unwanted activity like rogue trading algorithms, credit overages, etc. RiskXposure may be integrated with RiskWay, which is a trade control gateway for trading equities, to help users trade across multiple destinations while supporting managed activity with a robust set of trade risk controls.

Pre-Trade Risk Checks

Limits set in RX are sent to order entry gateways. Orders passing through the gateways are reviewed and possibly rejected before delivery to exchanges.

SOV, SOQ, Price Collars

Separate limits are available per asset class for SOQ (single order quantity), SOV (single order value), contract premium, and price collars.

Risk Checks

| Risk Check | Description | Action On Breach | Visible in Riskway | Visible in RX |
|---|---|---|---|---|
| Equity SOQ Limit | A limit on the number of shares in an order. Set as a function of the share price. | Order is rejected. | Yes | No |
| Equity SOV Limit | Maximum order value (shares * price) per order. | Order is rejected. | Yes | No |
| Tiered Equity Price Collar | Price of an equity order is checked to ensure it is in a range around the Best Bid & Offer. Multiple price collar ranges are configurable based on order price. Price collar checks can enforce dollar ranges or percent value ranges. | Order is rejected. | Yes | No |
| % ADV as SOQ | Limits orders to within a percentage of the 20 day average daily volume for the symbol. | Order is rejected. | Yes | No |
| Options SOQ | A limit on the number of contracts in an order. Set as a function of the option price. | Order is rejected. | Yes | No |
| Option SOV Limit | The maximum order value (contracts * price) per option. | Order is rejected. | Yes | No |
| Options Max Premium | Restriction on the maximum price of an options contract | Order is rejected. | Yes | No |
| Option Contracts Limit | A limit to the total number of option contracts bought and sold during the trading day. | Order is rejected. | Yes | No |
| Tiered Option Price Collar | Price of an option order is checked to ensure it is in a range around the Best Bid & Offer. Multiple price collar ranges are configurable based on order price. Price collar checks can enforce dollar ranges or percent value ranges. | Order is rejected. | Yes | No |
| Futures SOQ | A per order risk check set on the shares/contracts requested in individual futures orders. | Order is rejected. | Yes | No |
| Multi Leg SOV | A limit on the combined value of a multileg order containing equities and options. | Order is rejected. | Yes | No |

Kill Switches

RX can disable trading of specific assets, or all trading for the entire enterprise, or for select traders.

| Risk Check | Description | Action On Breach | Visible in Riskway | Visible in RX |
|---|---|---|---|---|
| Equity Kill Switch | Disables all equity trading for a trader or group of traders. | Order is rejected. | Yes | No |
| Option Kill Switch | Disables all option trading for a trader or group of traders. | Order is rejected. | Yes | No |
| Disable All Trading | Disables all trading for a trader or group of traders. | Order is rejected. | Yes | No |

Restricted Stocks, ETB

Restricted stock lists, and ETB validation is enforced before orders go to market.

| Risk Check | Description | Action On Breach | Visible in Riskway | Visible in RX |
|---|---|---|---|---|
| Easy To Borrow (ETB) | Order is checked against broker's ETB list. | Order is rejected. | Yes | No |
| Short Sale Restricted Stock | Order is checked against the broker's Restricted Stock list. | Order is rejected. | Yes | No |
| Restricted Stock by Side | Order is checked against broker's Restricted Stock list based on the side. | Order is rejected. | Yes | No |
| Long/ Short Sale | Order is checked against long portfolio position to ensure sell is long sale. | Order is rejected. | Yes | No |

At-Trade Risk Checks

At-Trade risk checks are updated with execution messages read from trading exchanges. If an execution creates a portfolio condition that exceed the allowed limit for a trader, RX will create a breach condition that is sent to connected gateways. This breach notification informs the gateway either to reject all further trades from a trader (reject all mode), or to only allow specific order types that will decrease the trader's risk (liquidation mode).

Portfolio Market Value Risk Checks

RX can track and limit growing portfolio value (net, gross, long, and short).

| Risk Check | Description | Action On Breach | Visible in Riskway | Visible in RX |
|---|---|---|---|---|
| Leverage Limit | A limit on the portfolio gross market value divided by the current equity. | RX screen alert, Email alert, Portfolio level "reject all." | Yes | Yes |
| Portfolio GMV Limit | Limitation on the absolute value of the long market value plus the short market value of a portfolio. | RX screen alert, Email alert, Portfolio level liquidate mode. | Yes | Yes |
| Portfolio GMV/ Equity Limit | The gross market value limit divided by the equity limit. | RX screen alert, Email alert, Portfolio level liquidate mode. | Yes | Yes |
| Portfolio LMV Limit | The limit to the market value of all long positions for the portfolio. | RX screen alert, Email alert, Portfolio level liquidate mode. | Yes | Yes |
| Portfolio NMV Limit | The net market value limit for the portfolio. | RX screen alert, Email alert, Portfolio level liquidate mode. | Yes | Yes |
| Portfolio NMV/ Equity Limit | The net market value divided by the equity limit for the portfolio. | RX screen alert, Email alert, Portfolio level liquidate mode. | Yes | Yes |
| Portfolio SMV Limit | A limit on the short market value of the portfolio. | RX screen alert, Email alert, Portfolio level liquidate mode. | Yes | Yes |
| Neutrality Ratio | The absolute value of the net market value divided by the gross market value. | RX screen alert, Email alert. | Yes | Yes |
| Excess or Deficit Limit | A constraint on the amount of live equity a trader must keep in reserve. One option is to require an equity amount greater than a percentage of the GMV of the trader's portfolio. Another option is to set a fixed requirement margin. | RX screen alert, Email alert. | Yes | Yes |
| Stock Shares Limit | Limit on total number of shares held. | RX screen alert, Email alert. | Yes | Yes |

Portfolio Loss Limits

RX can alert on and limit portfolio losses, both realized by held positions, and unrealized due to the current market value of a portfolio.

| Risk Check | Description | Action On Breach | Visible in Riskway | Visible in RX |
|---|---|---|---|---|
| Realized Loss Limit | Limit on the realized profit and loss of the trader portfolio. | RX screen alert, Email alert, Portfolio level liquidate mode. | Yes | Yes |
| Unrealized Loss Limit | Limit on the unrealized profit and loss of the portfolio considering current market prices. | RX screen alert, Email alert, Portfolio level liquidate mode. | Yes | Yes |
| Total Loss Limit | The sum of realized and unrealized profit and loss. | RX screen alert, Email alert, Portfolio level liquidate mode. | Yes | Yes |
| Total Loss Over Equity | A limit to the realized plus unrealized loss a trader can make as a percentage of their current equity. | RX screen alert, Email alert, Portfolio level liquidate mode. | Yes | Yes |

Portfolio Concentration Limits

RX can track and prevent traders from forming excessively concentrated portfolios with positions in just a few symbols.

| Risk Check | Description | Action On Breach | Visible in Riskway | Visible in RX |
|---|---|---|---|---|
| GMV % Concentration Limit | The maximum percentage that the Gross Market Value of any one instrument can be as compared to the Gross Market Value of the portfolio. | RX screen alert, Email alert, Portfolio level liquidate mode. | Yes | Yes |
| LMV % Concentration Limit | The maximum percentage that the long market value of any one instrument can be as compared to the Long Market Value of the portfolio. | RX screen alert, Email alert, Portfolio level liquidate mode. | Yes | Yes |
| SMV % Concentration Limit | The maximum percentage that the Short Market Value of any one instrument can be as compared to the Short Market Value of the portfolio. | RX screen alert, Email alert, Portfolio level liquidate mode. | Yes | Yes |
| $Delta Concentration Limit | The Dollar Delta limit on any position within a portfolio compared to the Dollar Delta of the entire portfolio (US only). | Portfolio level RX screen alert, Email alert, liquidate mode. | Yes | Yes |

-continued

| Risk Check | Description | Action On Breach | Visible in Riskway | Visible in RX |
|---|---|---|---|---|
| Con-solidated Require-ment Concen-tration | A limit to the potential loss in a single product and its derivative instruments versus the TIMS-based worst case requirement of the entire trader portfolio. | RX screen alert, Email alert | No | Yes |

Locate Management

Locates can be tracked either in a pre-trade fashion or at-trade.

Risk Checks

| Risk Check | Description | Action On Breach | Visible in Riskway | Visible in RX |
|---|---|---|---|---|
| $Delta Concen-tration Limit | The Dollar Delta limit on any position within a portfolio compared to the Dollar Delta of the entire portfolio (US only). | RX screen alert, Email alert, Portfolio level liquidate mode. | Yes | Yes |
| Con-solidated Require-ment Concen-tration | A limit to the potential loss in a single product and its derivative instruments versus the TIMS-based worst case requirement of the entire trader portfolio. | RX screen alert, Email alert | No | Yes |
| Order Based Locates | Order is checked against remaining locate quantity based on total orders in the market. | Order is rejected. | Yes | No |
| Execution Based Locates | Order is checked against remaining locate quantity based on executions. | Order is rejected. | No | Yes |

Order Pattern Limits

RX can temporarily suspend traders when certain trading patterns are detected.

| Risk Check | Description | Action On Breach | Visible in Riskway | Visible in RX |
|---|---|---|---|---|
| Option Fill Rate | Limits the number of option executions a trader can have per second. If the trader breaches this limit, they will be unable to place option orders for a configurable timeout period. | RX screen alert, Email alert, option trading suspended temporarily. | Yes | Yes |
| Duplicate Order Patterns | RX scans for duplicate orders with in a configurable time window. | RX screen alert, Email alert, similar duplicate orders are rejected for a time-out period. | Yes | Yes |

-continued

| Risk Check | Description | Action On Breach | Visible in Riskway | Visible in RX |
|---|---|---|---|---|
| Self Cross Check | RX periodically scans for self cross trades, where the same MPID participates in both sides of a match, and creates breaches if they are found. | RX screen alert, Email alert | No | Yes |

Portfolio Capital Risk Checks

| Risk Check | Description | Action On Breach | Visible in Riskway | Visible in RX |
|---|---|---|---|---|
| Committed Capital Limit | A limit on intraday portfolio value minus offsetting BOD value. | RX screen alert, Email Alert, Portfolio level "liquidate only." | Yes | Yes |
| Buy Capital Limit | A limit on the running sum of all trader buy executions (Shares * Price) for the day. | RX screen alert, Email alert, Portfolio level "reject all." | Yes | Yes |
| Net Capital Limit | Absolute value of buy capital-sell capital. | RX screen alert, Email alert, Portfolio level "reject all." | Yes | Yes |
| Sell Capital | Limitation on the running sum of all sell executions (Shares * Price) for the day. | RX screen alert, Email alert, Portfolio level "reject all." | Yes | Yes |
| Total Capital | The running sum of all executions (Shares * Price) over the trading day. | RX screen alert, Email alert, Portfolio level "reject all." | Yes | Yes |

Position Level Risk Checks

As RX reads execution messages from exchanges, it tracks and updates the positions of each trader. These risk checks limit the exposure allowed in any single trader position. RX can also be configured to allow separate limits to be set on ETFs.

| Risk Check | Description | Action On Breach | Visible in Riskway | Visible in RX |
|---|---|---|---|---|
| Futures Net Contracts | A trader position limit set for individual futures contracts. | RX screen alert, Email alert. | Yes | Yes |
| Symbol ADV | A limit to the total number of shares a trader is allowed to buy and sell in any symbol. | RX screen alert, Email Alert, Symbol level liquidation mode. | Yes | Yes |

-continued

| Risk Check | Description | Action On Breach | Visible in Riskway | Visible in RX |
|---|---|---|---|---|
| Symbol NMV Limit | A limit on the Net Market Value of any symbol/position. | RX screen alert, Email Alert, Symbol level liquidation mode. | Yes | Yes |
| Symbol NMV Over Equity Limit | A limit to any symbol's net market value divided by the trader's current equity. | RX screen alert, Email Alert, Symbol level liquidation mode. | Yes | Yes |
| ETF Symbol ADV | A limit to the total number of shares a trader is allowed to buy and sell in an ETF symbol. | RX screen alert, Email Alert, Symbol level liquidation mode. | Yes | Yes |
| ETF Symbol NMV Limit | A limit on the Net Market Value of any ETF in the trader portfolio. | RX screen alert, Email Alert, Symbol level liquidation mode. | Yes | Yes |
| ETF Symbol NMV Over Equity Limit | A limit to any ETF's net market value divided by the current trader equity. | RX screen alert, Email Alert, Symbol level liquidation mode. | Yes | Yes |

Option Greek Risk Checks

RX supports limits on combined exposure to cross-asset risk. Limits can be placed on the combined risk of positions in equities and their related options (US only).

| Risk Check | Description | Action On Breach | Visible in Riskway | Visible in RX |
|---|---|---|---|---|
| Position $Delta | A maximum Dollar Delta limit for any of the trader's positions. | RX screen alert, Email Alert, Symbol level liquidation mode. | Yes | Yes |
| Position $Delta/ Equity | A limit on the Dollar Delta divided by equity for any of the trader's positions. | RX screen alert, Email Alert, Symbol level liquidation mode. | Yes | Yes |
| Position $Gamma | A maximum Dollar Gamma limit for any of the trader's positions. | RX screen alert, Email Alert, Symbol level liquidation mode. | Yes | Yes |
| Position $Gamma/ Equity | A limit on the Dollar Gamma divided by equity for any of the trader's positions. | RX screen alert, Email Alert, Symbol level liquidation mode. | Yes | Yes |

-continued

| Risk Check | Description | Action On Breach | Visible in Riskway | Visible in RX |
|---|---|---|---|---|
| Portfolio $Delta | A limit on the Dollar Delta for a trader's portfolio | RX screen alert, Email alert, Portfolio level liquidate mode. | Yes | Yes |
| Portfolio $Delta/ Equity | A trader portfolio limit on Dollar Delta divided by equity. | RX screen alert, Email alert, Portfolio level liquidate mode. | Yes | Yes |
| Portfolio $Gamma | A limit on the Dollar Gamma for a trader's portfolio. | RX screen alert, Email alert, Portfolio level liquidate mode. | Yes | Yes |
| Portfolio $Gamma/ Equity | A trader portfolio limit on Dollar Gamma divided by equity. | RX screen alert, Email alert, Portfolio level liquidate mode. | Yes | Yes |
| Portfolio $Vega | A limit on the Dollar Vega for a trader's portfolio. | RX screen alert, Email alert, Portfolio level liquidate mode. | Yes | Yes |
| Portfolio $Vega/ Equity | A trader portfolio limit for calculated Vega divided by equity. | RX screen alert, Email alert, Portfolio level liquidate mode. | Yes | Yes |
| GMV Dollar Delta | A trader portfolio limit for the Dollar Delta adjusted Gross Market Value. | RX screen alert, Email alert, Portfolio level liquidate mode. | Yes | Yes |
| GMV Dollar Delta/ Current Equity | A trader portfolio limit for the Dollar Delta adjusted Gross Market Value divided by equity. | RX screen alert, Email alert, Portfolio level liquidate mode. | Yes | Yes |

Portfolio Margin Risk Checks

RX can track and limit the theoretical losses a trader portfolio will incur under an array of simulated market shifts.

| Risk Check | Description | Action On Breach | Visible in Riskway | Visible in RX |
|---|---|---|---|---|
| Buying Power Limit | A limit on the calculated losses a portfolio can incur assuming a 'worst case' drop in value. The value loss of equities and options are determined from TIMS data. | RX screen alert, Email alert, Portfolio level liquidate mode. | Yes | Yes |
| Consolidated Requirement Limit | A limit to the TIMS worst-case analysis on a portfolio with additional security mapping and offsetting (futures, options on futures, ETFs, options on ETFs, and options on indexes). | RX screen alert, Email alert. | No | Yes |
| Consolidated Requirement/ Equity Limit | A limit to the TIMS worst-case analysis on a portfolio versus the amount of reserve equity held by the trader. | RX screen alert, Email alert. | No | Yes |
| Product Requirement/ Equity Limit | A limit on the ratio of the worst case possible loss from any of the derivative instruments of any single product versus the trader's equity. | RX screen alert, Email alert. | No | Yes |

Custom Stress Risk Checks

Custom stresses allow a client to define the their own shock scenarios that will be used to stress-test trader portfolios for potential losses.

| Risk Check | Description | Action On Breach | Visible in Riskway | Visible in RX |
|---|---|---|---|---|
| Custom Scenario 1 Over Equity | A limit on theoretical portfolio loss from the first price/volatility shock scenario divided by trader equity. | RX screen alert, Email alert. | No | Yes |
| Custom Scenario 2 Over Equity | A limit on theoretical portfolio loss from the second price/volatility shock scenario divided by trader equity. | RX screen alert, Email alert. | No | Yes |
| Custom Scenario 3 Over Equity | A limit on theoretical portfolio loss from the third price/volatility shock scenario divided by trader equity. | RX screen alert, Email alert. | No | Yes |
| Custom Scenario 4 Over Equity | A limit on theoretical portfolio loss from the fourth price/volatility shock scenario divided by trader equity. | RX screen alert, Email alert. | No | Yes |
| Custom Scenario 5/Over Equity | A limit on theoretical portfolio loss from the fifth price/volatility shock scenario divided by trader equity. | RX screen alert, Email alert. | No | Yes |
| Custom Scenario 6 Over Equity | A limit on theoretical portfolio loss from the sixth price/volatility shock scenario divided by trader equity. | RX screen alert, Email alert. | No | Yes |
| Custom Scenario 7 Over Equity | A limit on theoretical portfolio loss from the seventh price/volatility shock scenario divided by trader equity. | RX screen alert, Email alert. | No | Yes |

-continued

| Risk Check | Description | Action On Breach | Visible in Riskway | Visible in RX |
|---|---|---|---|---|
| Custom Scenario 8 Over Equity | A limit on theoretical portfolio loss from the eighth price/volatility shock scenario divided by trader equity. | RX screen alert, Email alert. | No | Yes |
| Custom Scenario 9 Over Equity | A limit on theoretical portfolio loss from the ninth price/volatility shock scenario divided by trader equity. | RX screen alert, Email alert. | No | Yes |
| Custom Scenario 10 Over Equity | A limit on theoretical portfolio loss from the tenth price/volatility shock scenario divided by trader equity. | RX screen alert, Email alert. | No | Yes |
| Breakup 1 Over Equity | A portfolio-wide limit on losses using the worst-case result per underlying from two of the defined custom scenarios. | RX screen alert, Email alert. | No | Yes |
| Breakup 2 Over Equity | A portfolio-wide limit on losses using the worst-case result per underlying from two of the defined custom scenarios. | RX screen alert, Email alert. | No | Yes |
| Largest Issuer Loss 1 Over Equity | A limit per underlying (with related instruments offsetting). Up to ten of the custom scenarios are used to analyze the maximum theoretical loss possible in an underlying versus trader equity. | RX screen alert, Email alert. | No | Yes |
| Largest Issuer Loss 1 Over Equity | A limit per underlying (with related instruments offsetting). Up to ten of the custom scenarios are used to analyze the maximum theoretical loss possible in an underlying versus trader equity. | RX screen alert, Email alert. | No | Yes |

Open Order Risk Checks

RX can also track the risk of a trader's portfolio plus risk from open orders. When an order is submitted to the gateway, it consumes credit from a pool shared across all gateways connected to RX. If there is not enough credit for the order, then it is rejected before being routed to a exchange.

Risk Checks

| Risk Check | Description | Action On Breach | Visible in Riskway | Visible in RX |
|---|---|---|---|---|
| Open Buying Power Limit | A limit on a trader's executed Buying Power, plus all TIMS valued open orders times a discount coefficient. | RX screen alert, Email alert. | No | Yes |
| Open GMV Limit | Limit to the GMV of a portfolio plus a discounted amount for open orders. | RX screen alert, Email alert. | No | Yes |
| Open Leverage Limit | A limit on the value of all held positions plus a discounted amount for open orders, divided by trader equity. | RX screen alert, Email alert. | No | Yes |

Gateway Configuration Checks

Order entry gateways in the TradeGuard system can be configured to enforce these checks. These are performed pre-trade at the gateway without any interaction with the RX.

| Risk Check | Description | Action On Breach | Visible in Riskway | Visible in RX |
|---|---|---|---|---|
| Time in Force | Order is checked for restricted times in force. | Order is rejected. | No | No |
| Verify Lending Broker | Verifies that order has an active locate flag identifying valid lending broker. | Order is rejected. | No | No |
| Order Type Checks | Order is checked for restricted order types (e.g., Iceberg, ISO). | Order is rejected. | No | No |
| MOC/LOC Rules | Orders are validated against exchange MOC/LOC rules. | Order is rejected. | No | No |
| Tag Script | Orders can be filtered based on the contents of any FIX field. | Order is rejected. | No | No |
| Penny/ Sub-Penny Pricing Constraints | Orders for securities above one dollar must be in increments of one penny. Orders for securities below one dollar can increment by a one hundredth of a penny. | Order is rejected. | No | No |
| Canadian Board Lot Validation | Orders for Canadian securities must increment in units determined by the securities previous closing price. | Order is rejected. | No | No |

| Risk Check | Description | Action On Breach | Visible in Riskway | Visible in RX |
|---|---|---|---|---|
| | Maximum theoretical loss possible in an underlying versus trader equity | | | |

Risk checks, such as one or more of the examples above, enable the risk analysis computer system to monitor capital usage and manage limits across accounts.

The above description sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices have been omitted so as not obscure the description with unnecessary detail. Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as, for example, solid-state memory, magnetic disk, optical disk, etc. containing an appropriate set of computer instructions that may be executed by a processor to carry out the techniques described herein.

The term "signal" (e.g., a data signal, a data packet signal, etc.) is used herein to encompass any signal that transfers information from one position or region to another in an electrical, electronic, electromagnetic, optical, or magnetic form. Signals may be conducted from one position or region to another by electrical, optical, or magnetic conductors including via waveguides, but the broad scope of signals also includes light and other electromagnetic forms of signals (e.g., infrared, radio, etc.) and other signals transferred through non-conductive regions due to electrical, electronic, electromagnetic, or magnetic effects, e.g., wirelessly. In general, the broad category of electrical signals includes both analog and digital signals and both wired and wireless mediums. An analog signal includes information in the form of a continuously variable physical quantity, such as voltage; a digital signal, in contrast, includes information in the form of discrete values of a physical characteristic, which could also be, for example, voltage.

Unless the context indicates otherwise, the terms "circuitry" and "circuit" refer to structures in which one or more electronic components have sufficient electrical connections to operate together or in a related manner. In some instances, an item of circuitry can include more than one circuit. A "processor" is a collection of electrical circuits that may be termed as a processing circuit or processing circuitry and may sometimes include hardware and software components. In this context, software refers to stored or transmitted data that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Hardware implementations of certain aspects of the technology described above may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Circuitry above is described structurally based on its configured operation or other characteristics. For example, circuitry that is configured to perform control operations may be referred to herein as control circuitry and circuitry that is configured to perform processing operations may be referred to as processing circuitry.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed.

The term "system" as used herein means a computer system.

The terms "automatic" and "automatically" as used herein mean performed by or under the control of a computer.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A network capture device comprising:

a network interface configured to receive data packets received by one or more packet switches in a data communications network, where the data communications network is configured to communicate data between source computing nodes and destination computing nodes; and at least one processor including processing circuitry configured to process the data packets by, for each of the data packets, decoding the data packet and determining whether the data packet is a financial data packet or not;

wherein the network interface is further configured to transmit, to a risk exposure computer system, the data packets determined by the one or more processors to be financial data packets.

2. The network capture device in claim 1, wherein the data communications network includes one or more data paths separate from the network capture device that direct the data packets towards one or more of the destination computing nodes.

3. The network capture device in claim 1, wherein the one or more processors includes a normalization processor configured to eliminate duplicate data packets and convert remaining financial data packets to a standard data packet format.

4. The network capture device in claim 2, wherein the data packets from the source computing nodes include intraday security issue information involving disparate systems and multiple liquidity destinations.

5. The network capture device in claim 1, wherein the financial data packets include data packets that are not expected, authorized, or configured for risk monitoring.

6. The network capture device in claim 1, wherein some of the data packets include financial data and some of the data packets do not include financial data.

7. The network capture device in claim 1, wherein at least some of the financial data packets are formatted with a FIX communications protocol or with an OUCH communications protocol.

8. A method of processing data packets in a data communications network, the method comprising:

a network capture device receiving data packets received by one or more packet switches in the data communications network;

the network capture device processing each of the data packets by one or more processors decoding the data packet and determining whether the data packet is a financial data packet or not; and the network capture device transmitting, to a risk exposure computer system, the data packets determined by the one or more processors to be financial data packets.

9. The method in claim 8, wherein the data packets are directed towards one or more of the destination computing nodes along one or more data paths that do not include the network capture device.

10. The method in claim 8, further comprising:

the network capture device transmitting the financial data packets to a normalization data processor that eliminates duplicate data packets and converts remaining financial data packets to a standard data packet format, and the normalization data processor transmitting, to the risk exposure computer system, the financial data packets converted to the standard data packet format.

11. The method in claim 8, wherein received data packets include intraday security issue information involving disparate systems and multiple liquidity destinations.

12. The method in claim 8, wherein the financial data packets include data packets that are not expected, authorized, or configured for risk monitoring.

13. The method in claim 8, wherein some of the data packets include financial data and some of the data packets do not include financial data.

14. The method in claim 8, wherein at least some of the financial data packets are formatted with a FIX communications protocol or with an OUCH communications protocol.

15. A non-transitory, computer-readable storage medium storing computer-readable instructions that, when executed by one or more processors, cause the one or more processors to perform a method of processing data packets in a data communications network, the method comprising:

a network capture device receiving data packets received by one or more packet switches in the data communications network, wherein the data communications network is configured to communicate data between source computing nodes and destination computing nodes, wherein the one or more processors include the network capture device having a packet analyzer, a network analyzer, a protocol analyzer, or a packet sniffer, and wherein the network capture device is separate from the destination computing nodes;

the network capture device processing each of the data packets by one or more processors decoding the data packet and determining whether the data packet is a financial data packet or not; and the network capture device transmitting, to a risk exposure computer system, the data packets determined by the one or more processors to be financial data packets.

16. The non-transitory, computer-readable storage medium in claim 15, wherein the data communications network includes one or more data paths separate from the network capture device that direct the data packets towards one or more of the destination computing nodes.

17. The non-transitory, computer-readable storage medium in claim 15, wherein data packets from the source computing nodes include intraday security issue information involving disparate systems and multiple liquidity destinations.

18. The non-transitory, computer-readable storage medium in claim 15, wherein the financial data packets include data packets that are not expected, authorized, or configured for risk monitoring.

* * * * *